United States Patent
Herman Saffar et al.

(10) Patent No.: US 11,768,936 B2
(45) Date of Patent: Sep. 26, 2023

(54) ANOMALY-BASED RANSOMWARE DETECTION FOR ENCRYPTED FILES

(71) Applicant: EMC IP Holding Company LLC, Hopkinton, MA (US)

(72) Inventors: Or Herman Saffar, Beer Sheva (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

(21) Appl. No.: 16/050,581

(22) Filed: Jul. 31, 2018

(65) Prior Publication Data

US 2020/0042703 A1 Feb. 6, 2020

(51) Int. Cl.
G06F 21/56 (2013.01)
G06F 21/55 (2013.01)
G06N 20/00 (2019.01)
G06F 11/14 (2006.01)

(52) U.S. Cl.
CPC .......... *G06F 21/565* (2013.01); *G06F 21/552* (2013.01); *G06F 21/554* (2013.01); *G06N 20/00* (2019.01); *G06F 11/1435* (2013.01); *G06F 11/1451* (2013.01); *G06F 2201/84* (2013.01)

(58) Field of Classification Search
CPC .... G06F 21/565; G06F 21/552; G06F 21/554; G06F 11/1435; G06F 11/1451; G06F 2201/84; G06F 11/1458; G06F 21/562; G06F 21/6218; G06N 20/00
See application file for complete search history.

(56) References Cited

U.S. PATENT DOCUMENTS

| | | | | |
|---|---|---|---|---|
| 9,652,354 | B2* | 5/2017 | Filimonov | G06N 7/005 |
| 10,469,525 | B2* | 11/2019 | Hittel | G06F 21/565 |
| 2014/0047513 | A1* | 2/2014 | van't Noordende | G06F 21/44 726/4 |
| 2016/0149699 | A1* | 5/2016 | Gauda | H04L 63/0428 713/168 |
| 2016/0378988 | A1* | 12/2016 | Bhashkar | G06F 21/566 726/24 |
| 2017/0116433 | A1* | 4/2017 | Erofeev | H04L 9/088 |

(Continued)

OTHER PUBLICATIONS

Thomas et al., "Improving Backup System Evaluations in Information Security Risk Assessments to Combat Ransomware", Computer and Information Science, vol. 11, No. 1, (Jan. 3, 2018).

(Continued)

*Primary Examiner* — Henry Tsang
(74) *Attorney, Agent, or Firm* — Ryan, Mason & Lewis, LLP

(57) ABSTRACT

Techniques are provided for anomaly-based ransomware detection of encrypted files. One exemplary method comprises obtaining metadata for an encrypted file; applying an anomaly detection technique to the metadata to compare at least one attribute in the metadata to one or more corresponding historical baseline values for the at least one attribute; and determining whether the encrypted file comprises a ransomware encryption based on the comparison. In some embodiments, one or more of file extension attributes, file size attributes and file name attributes in the metadata are compared to the one or more corresponding historical baseline values to identify a ransomware attack.

20 Claims, 6 Drawing Sheets

(56) References Cited

U.S. PATENT DOCUMENTS

| | | | |
|---|---|---|---|
| 2017/0206353 A1* | 7/2017 | Jai | H04L 67/1097 |
| 2018/0024893 A1* | 1/2018 | Sella | G06N 7/005 |
| | | | 707/648 |
| 2018/0048658 A1* | 2/2018 | Hittel | H04L 63/145 |
| 2018/0278647 A1* | 9/2018 | Gabaev | H04L 63/1425 |

OTHER PUBLICATIONS

Scaife et al., "CryptoLock (and Drop It): Stopping Ransomware Attacks on User Data", IEEE 36th International Conference on Distributed Computing Systems, (2016).

Cabaj et al., "Software-Defined Networking-based Crypto Ransomware Detection Using HTTP Traffic Characteristics", Computers & Electrical Engineering, vol. 66, pp. 353-368, (Feb. 2018).

Cabaj et al., "Using Software-Defined Networking for Ransomware Mitigation: the Case of CryptoWall", IEEE Network, vol. 30 Isue 6, pp. 14-20, (Dec. 1, 2016).

\* cited by examiner

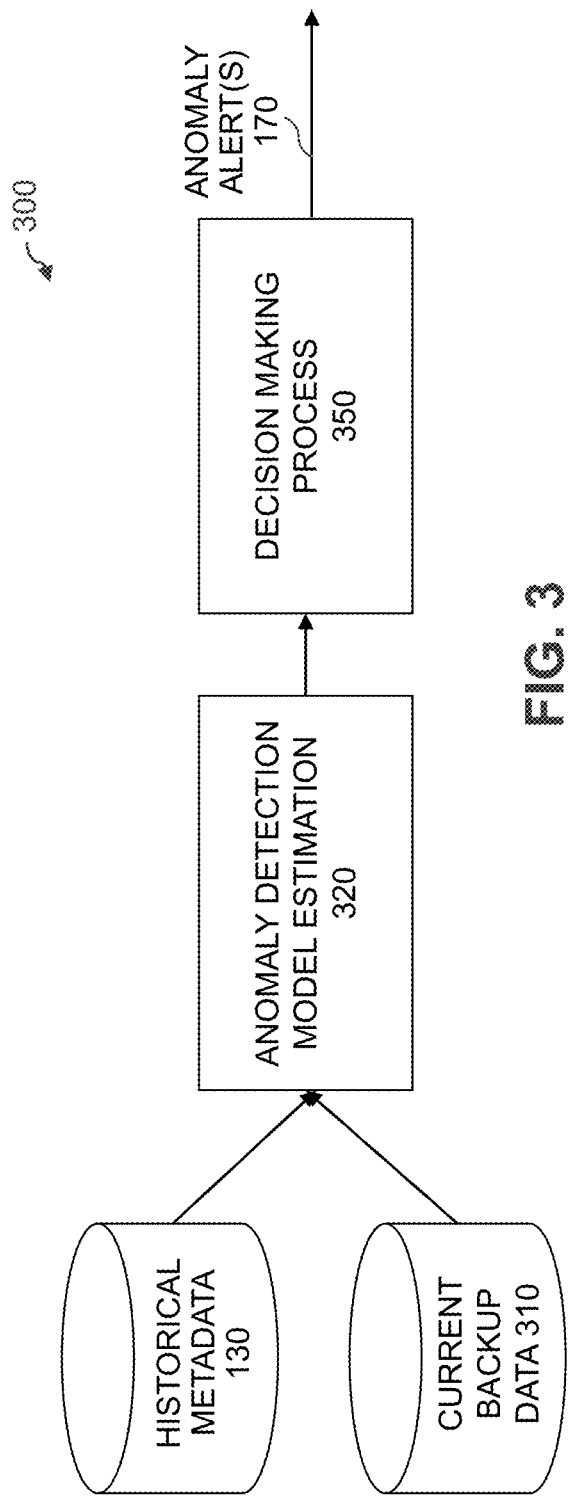

ANOMALY-BASED RANSOMWARE DETECTION FOR ENCRYPTED FILES

FIELD

The field relates generally to computer systems and, more particularly, to malware detection.

BACKGROUND

Malicious software or "malware" is any software used to interfere with computer system operations, gain unauthorized access to computer systems, acquire private or otherwise sensitive information, display unwanted advertising, or conduct any other harmful activities. Malware can take the form of executable code, scripts, active content, and other software. While many forms of malware can cause harm to computer systems and hardship to its users, one form in particular, i.e., ransomware, is troublesome for data centers that store large amounts of critical data for enterprises and clients. Ransomware is malicious program code that encrypts data and prevents access to the encrypted data until a ransom is paid.

Backup service providers receive encrypted backup storage files from their customers. It is challenging for the backup service provider to determine whether an encrypted file received by the backup service provider from a customer for storage is encrypted only by a normal encryption process or whether the encrypted file contains a ransomware encryption as well.

A need therefore exists for techniques for detecting when encrypted files, such as encrypted backup storage files, are also encrypted by ransomware.

SUMMARY

In one embodiment, a method comprises obtaining metadata for an encrypted file; applying an anomaly detection technique to the metadata to compare at least one attribute in the metadata to one or more corresponding historical baseline values for the at least one attribute; and determining whether the encrypted file comprises a ransomware encryption based on the comparison.

In some embodiments, one or more file extension attributes in the metadata are compared to the one or more corresponding historical baseline values to reveal a renaming of the one or more file extension attributes and/or a deviation from an expected file extension distribution. In further variations, one or more of file size attributes and file name attributes in the metadata are compared to the one or more corresponding historical baseline values to identify a ransomware attack.

Other illustrative embodiments include, without limitation, apparatus, systems, methods and computer program products comprising processor-readable storage media.

BRIEF DESCRIPTION OF THE DRAWINGS

FIG. 3 illustrates implementation of an anomaly-based ransomware training and detection process, according to some embodiments of the disclosure

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for anomaly-based ransomware detection of encrypted files.

As noted above, backup service providers receive encrypted backup storage files from their customers. One or more embodiments of the disclosure enable the backup service providers to alert their customers when an encrypted file received by the backup service provider from a given customer for storage comprises a ransomware encryption in addition to the normal encryption process.

In some embodiments, the ransomware encryption is detected by identifying anomalies in the normal behavior of the metadata of the encrypted files. The disclosed ransomware detection techniques detect anomalies in the normal behavior of these files to determine whether the encrypted files, such as encrypted incremental files, that are sent by a customer to a backup service provider, secured by encryption, also contain a ransomware encryption.

Figure 1:
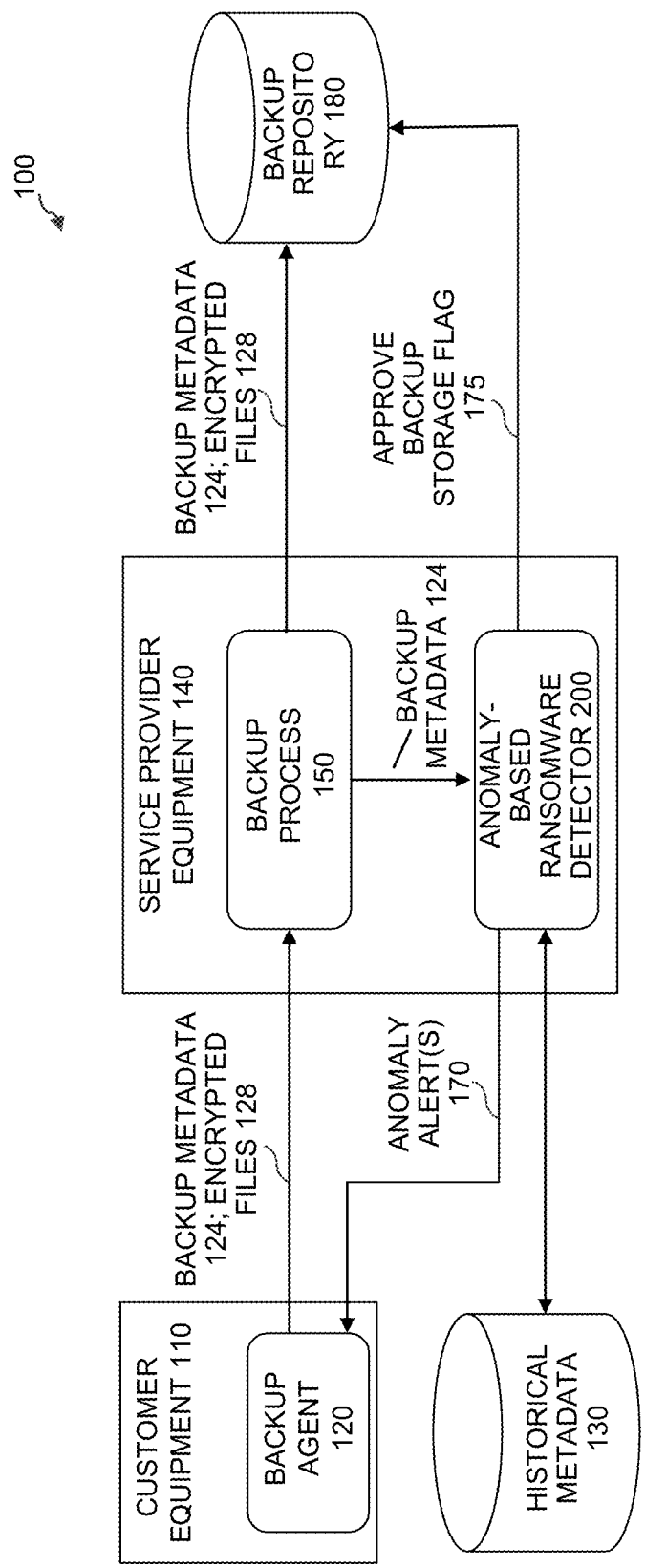
FIG. 1 illustrates an exemplary distributed computing environment, according to one embodiment of the disclosure.

FIG. 1 illustrates an exemplary distributed computing environment 100, according to one embodiment of the disclosure. As shown in FIG. 1, the exemplary distributed computing environment 100 comprises customer equipment 110, a service provider equipment 140 for a backup service provider, and one or more backup repositories 180.

Generally, the customer associated with the customer equipment 110 desires to backup one or more encrypted files 128 with the backup service provider using a backup agent 120, in a known manner. One of the stages to prepare the files for backup storage is an encryption process, that reduces the data security risk in case the files are lost or stolen. As noted above, encrypting the backup data can mitigate the data security problem, but makes it difficult to know whether the backup files are encrypted by a normal encryption process or by ransomware.

The exemplary service provider equipment 140 comprises a backup process 150 and an anomaly-based ransomware detector 200, as discussed further below in conjunction with FIGS. 2 and 3. The exemplary backup process 150 accepts the data for backup from the backup agent 120 and performs the backup processing to store the encrypted files 128 on the one or more backup repositories 180, in a known manner.

As shown in FIG. 1, in addition to the encrypted files 128 to be backed up, the backup agent 120 also sends corresponding backup metadata 124 to the exemplary backup process 150. The exemplary backup process 150 provides the backup metadata 124 with the encrypted files 128 to the one or more backup repositories 180, and also provides the backup metadata 124 to the exemplary anomaly-based ransomware detector 200.

The processing by the exemplary anomaly-based ransomware detector 200 is discussed further below in conjunction with FIG. 2. As shown in FIG. 1, if the exemplary anomaly-based ransomware detector 200 detects ransomware in one or more encrypted files 128, the anomaly-based ransomware detector 200 provides one or more anomaly alert(s) 170 to the backup agent 120 executing on the customer equipment 110. Likewise, if the exemplary anomaly-based ransomware detector 200 does not detect ransomware in one or more encrypted files 128, the anomaly-based ransomware detector 200 provides an approve backup storage flag 175 to the one or more backup repositories 180, so that the corresponding encrypted files 128 can be stored in the backup repository 180.

The exemplary anomaly-based ransomware detector 200 is trained in one or more embodiments using historical metadata 130, as discussed further below in conjunction with FIG. 3. In some embodiments, the historical metadata 130 is also used to evaluate the behavior of new encrypted files 128 and the corresponding backup metadata 124.

In one or more embodiments, the exemplary anomaly-based ransomware detector 200 monitors important sectors of the encrypted files 128 sent to the exemplary service provider equipment 140, such as file extensions, snapshot files' characteristics and other metadata of these files, as discussed further below. The anomaly-based ransomware detector 200 optionally employs machine learning techniques to detect more general anomaly behavior. The machine learning will rely on statistics collected from the backup metadata 124, as described below. Among other benefits, the disclosed anomaly-based machine learning ransomware detection models, in some embodiments, are time based and can take into account seasonality and trends in the backup metadata 124, as well as correlations within features that can add another layer of safety and accuracy. In further variations, additional or alternative statistics approaches and/or machine learning models can be employed, such as Gaussian mixture models.

The exemplary backup metadata 124 comprises, for example, file names and extensions (e.g., real extinction); creation date; modification date; file size; attributes such as read only/archive; changes from last backup (incremental backup); user permissions; and/or other file attributes.

Figure 2:
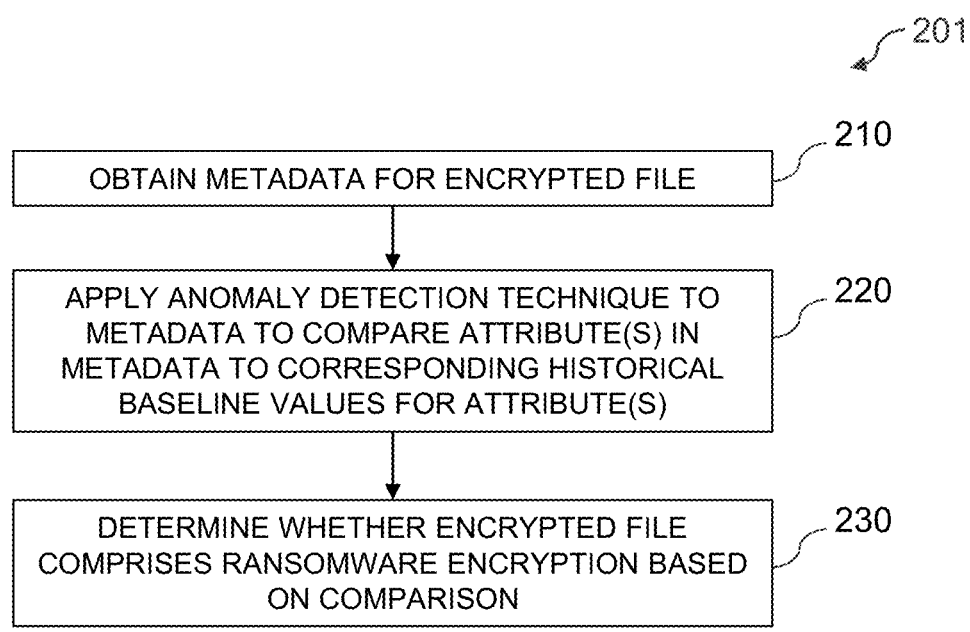
FIG. 2 is a flow chart illustrating an exemplary implementation of an anomaly-based ransomware detection process for detecting ransomware in one or more encrypted files of FIG. 1, according to an embodiment.

FIG. 2 is a flow chart illustrating an exemplary implementation of an anomaly-based ransomware detection process 201 using anomaly-based ransomware detector 200 for detecting ransomware in one or more encrypted files 128 of FIG. 1, according to one embodiment of the disclosure. In some embodiments, the anomaly-based ransomware detection process 201 is performed by a backup service provider as part of a backup of the one or more encrypted files 128.

As shown in FIG. 2, the exemplary anomaly-based ransomware detection process 201 initially obtains backup metadata 124 for an encrypted file 128 during step 210. Thereafter, the exemplary anomaly-based ransomware detection process 201 applies an anomaly detection technique to the metadata during step 220 to compare at least one attribute in the backup metadata 124 to one or more corresponding historical baseline values for the at least one attribute, for example, from the historical metadata 130.

Finally, the exemplary anomaly-based ransomware detection process 201 determines whether the encrypted file comprises a ransomware encryption based on the comparison during step 230.

FIG. 3 illustrates implementation of an anomaly-based ransomware training and detection process 300, according to some embodiments of the disclosure. As shown in FIG. 3, the exemplary anomaly-based ransomware training and detection process 300 comprises an anomaly detection model estimation stage 320 and a decision-making process 350. The exemplary anomaly detection model estimation stage 320 processes the historical metadata 130 to train and test the anomaly detection models, and to apply the disclosed anomaly-based ransomware detection techniques to current backup data 310. The exemplary decision-making process 350 processes the output of the anomaly detection model estimation stage 320 to determine whether the behavior of the current encrypted files 128 is normal or anomalous behavior.

The exemplary anomaly detection model estimation stage 320 applies one or more of a statistics technique and a machine learning technique. The machine learning technique, for example, employs at least one trained machine learning model that is trained using historical time-series data in the historical metadata 130 for each of a plurality of file types.

After monitoring and learning the baseline behavior, the exemplary anomaly detection model estimation stage 320 applies anomaly detection techniques to the backup metadata 124 of one or more new encrypted files 128 to compare at least one attribute in the backup metadata 124 to one or more corresponding historical baseline values for the at least one attribute in the historical metadata 130. The anomaly detection techniques include, for example, one or more of time-series outlier detection, k-nearest neighbor and recurrent neural networks.

Generally, the exemplary anomaly-based ransomware training and detection process 300 of FIG. 3 tracks the backup metadata 124 across time, and using historical metadata 130, learns how to classify one or more encrypted files 128 that have an abnormal change according to its corresponding backup metadata 124. For example, the creation date of the file that was changed, or many JPEG files that were changed at the same time would suggest an anomaly, as discussed further below.

After the model estimation performed by the exemplary anomaly detection model estimation stage 320, the decision-making process 350 is applied to find anomalous behavior in the current data and inform the security response team immediately. In some embodiments, the decision-making process 350 is different for each metric and will consider multiple metrics to determine a final decision about the container behavior of one or more encrypted files 128. The decision-making process 350 is comprised of, for example, threshold decisions for specific metrics and more complex decisions that are based on the entire data and the anomaly detection model estimation stage 320.

For example, the exemplary anomaly-based ransomware training and detection process 300 of FIG. 3 can detect when one or more encrypted files 128 sent to the exemplary service provider equipment 140 are larger than usual. One or more aspects of the present disclosure recognize that file sizes should not vary much for the backup over various points in time. When the encrypted files 128 sent to the exemplary service provider equipment 140, however, are encrypted by both normal encryption process and by ransomware, the encrypted files 128 will be larger than usual and therefore would be detectable using the disclosed anomaly detection techniques.

Likewise, the exemplary anomaly-based ransomware training and detection process 300 of FIG. 3 can detect when there are more encrypted files 128 sent to the exemplary service provider equipment 140 than usual. When there are a lot of encrypted files 128 changed at the same time and sent for a backup, this will suggest a situation in which the encrypted files 128 are encrypted by ransomware and therefore changed simultaneously.

As noted above, when encrypted files 128 are sent to the exemplary service provider equipment 140 for backup, the encrypted files 128 are encrypted by usual encryption process and sent with the corresponding backup metadata 124. The exemplary anomaly-based ransomware training and detection process 300 uses the backup metadata 124 of the encrypted files 128 to find anomalous behavior, suggesting that the encrypted files 128 are encrypted not only by the usual encryption process but also by a ransomware encryption.

It has been found, for example, that ransomware often renames and encrypts the file name extensions (e.g., .doc, .xls, .ppt, .mp3, and wallet) of the user personal documents that are encrypted to form the encrypted files 128. For example, the ransomware can rename the file name extensions on an individual file level. Most of the personal files of a user are not supposed to change over time (for example, photograph files and mp3 files). Thus, once these types of files are sent to the exemplary service provider equipment 140, they should not be sent again, as they should remain the same. Thus, if these types of files are sent to the exemplary service provider equipment 140 again, the exemplary anomaly-based ransomware training and detection process 300 will identify the encrypted files 128 as having ransomware encryption.

In addition, the ransomware can rename the file name extensions on a population of files. Thus, when the file extensions of a given population of new encrypted files 128 are sent to the exemplary service provider equipment 140 with suspicious extensions relative to the past usual extensions for the population of files sent to back-up, the exemplary anomaly-based ransomware training and detection process 300 will identify the encrypted files 128 as having ransomware encryption.

Figures 4A, 4B:
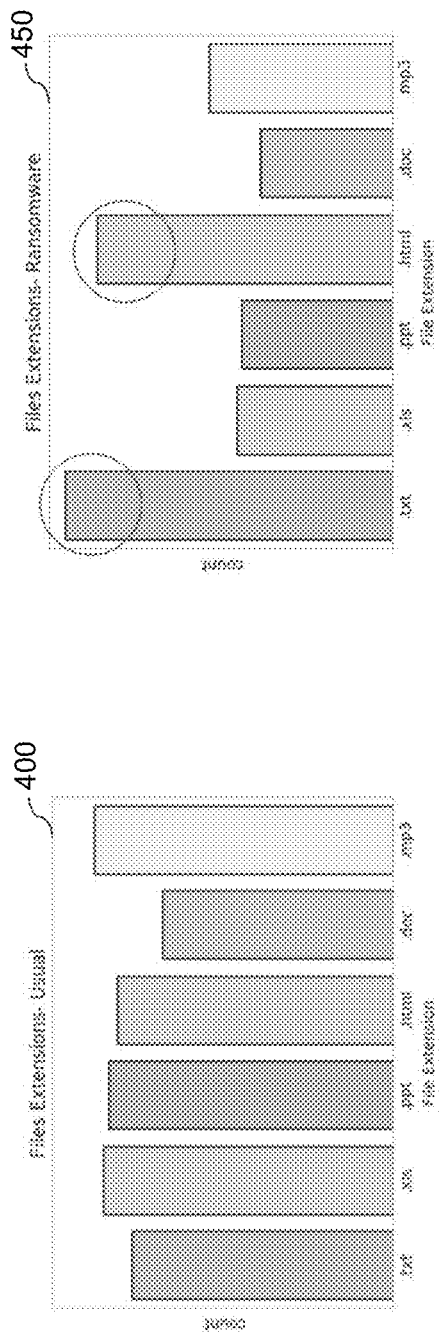
FIGS. 4A and 4B illustrate distributions of file extensions for an exemplary population of files before and after, respectively, a ransomware attack detected according to an embodiment of the disclosure.

FIG. 4A illustrates a distribution 400 of file extensions for an exemplary historical usage of a population of files. FIG. 4B illustrates the distribution 450 of file extensions for the same population of files of FIG. 4A following a ransomware attack. As shown in FIGS. 4A and 4B, the file extension distribution 450 after the ransomware attack is different than the file extension distribution 400 before the ransomware attack, suggesting a possible anomaly related to a ransomware attack. For example, in FIG. 4B, the number of files (e.g., shown in FIGS. 4A and 4B as a count) having .txt and .html extensions in FIG. 4B, relative to the number of files having other file extensions, suggests that the one or more encrypted files 128 include a ransomware encryption.

Thus, in some embodiments, the exemplary anomaly-based ransomware training and detection process 300 compares the file extension attribute of the backup metadata 124 for one or more encrypted files 128 to the one or more corresponding historical baseline values to identify a deviation from an expected file extension distribution.

It has also been found, for example, in the case of snapshot service files, the volume of these system restoration and backup files will be higher in the case of a ransomware attack. Generally, snapshot files sent to the exemplary service provider equipment 140 represent a point in time and therefore are not supposed to be sent more than once. In the event that snapshot service files are sent to the exemplary service provider equipment 140 twice, for example, the exemplary anomaly-based ransomware training and detection process 300 will suspect that the snapshot service files are encrypted by ransomware.

Thus, in some embodiments, the exemplary anomaly-based ransomware training and detection process 300 compares the file name extension attribute of the backup metadata 124 for one or more encrypted files 128 to the one or more corresponding historical baseline values to reveal that a snapshot file has been sent more than once.

Other embodiments of the disclosure recognize that in certain situations, the size of the encrypted files 128 of the number of the encrypted files 128 should not change significantly over time (e.g., when there are more files sent to the exemplary service provider equipment 140 than usual, suggesting that a lot of files were changed at the same time and then sent for a backup).

For example, an incremental backup approach stores file backups from points in time by organizing the data into increments of change between points in time. A full backup is typically made on one occasion and serves as a reference point for future incremental backups. A number of incremental backups are made after successive time periods. The system is restored to the date of the last incremental backup, which typically requires starting from the last full backup taken before the data loss, and then applying, in turn, each of the subsequent incremental backups. One or more aspects of the disclosed anomaly-based ransomware detection techniques recognize that the backup size of each increment should not substantially change over time. If the size of backup is larger than usual, for example, the disclosed anomaly detection techniques detect that the incremented piece of information was potentially encrypted by ransomware, in addition to the normal encryption process.

Among other benefits, the disclosed ransomware detection techniques are executed remotely with respect to the customer equipment 110 (e.g., the victim machine), and after the backup files have been encrypted and sent to the exemplary service provider equipment 140, to detect ransomware in the encrypted files 128.

One or more embodiments of the disclosure provide improved methods, apparatus and computer program products for anomaly-based ransomware detection of encrypted files. The foregoing applications and associated embodiments should be considered as illustrative only, and numerous other embodiments can be configured using the techniques disclosed herein, in a wide variety of different applications.

It should also be understood that the disclosed ransomware detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for anomaly-based ransomware detection of encrypted files may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based ransomware detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based ransomware detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
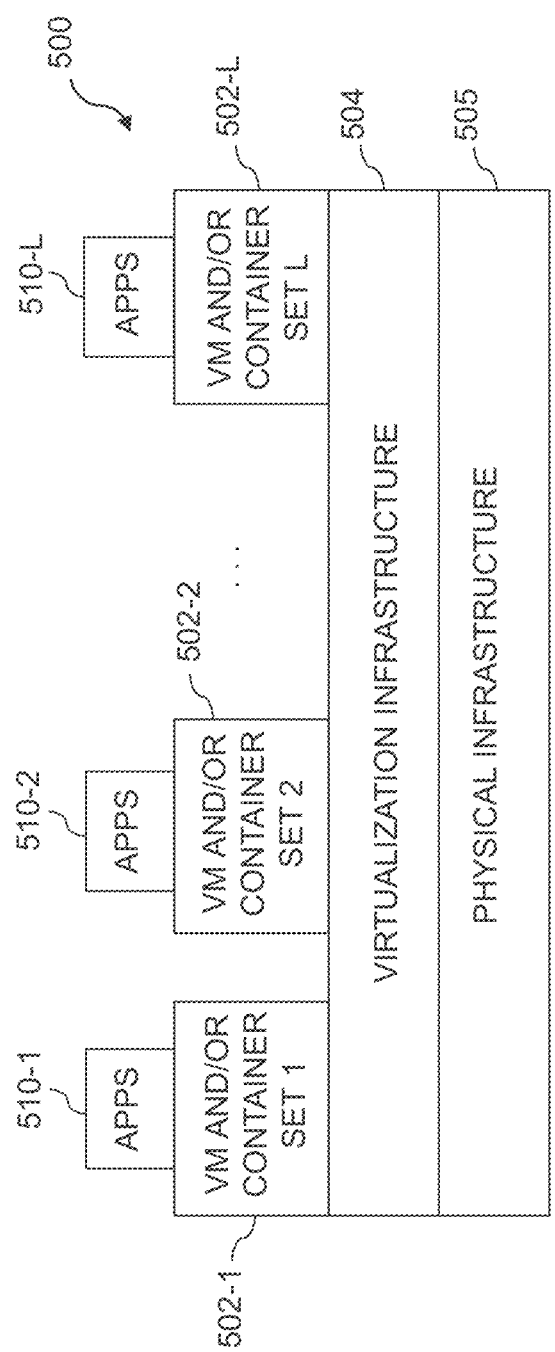
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the ransomware detection system. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide ransomware detection functionality of the type described above for one or more processes running on a given one of the VMs. For example, each of the VMs can implement ransomware detection control logic and associated ransomware detection functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide ransomware detection functionality of the type described above for one or more processes running on different ones of the containers. For example, a container host device supporting multiple containers of one or more container sets can implement one or more instances of ransomware detection control logic and associated ransomware detection functions for use in identifying ransomware in the encrypted files 128.

As is apparent from the above, one or more of the processing modules or other components of the disclosed ransomware detection system may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
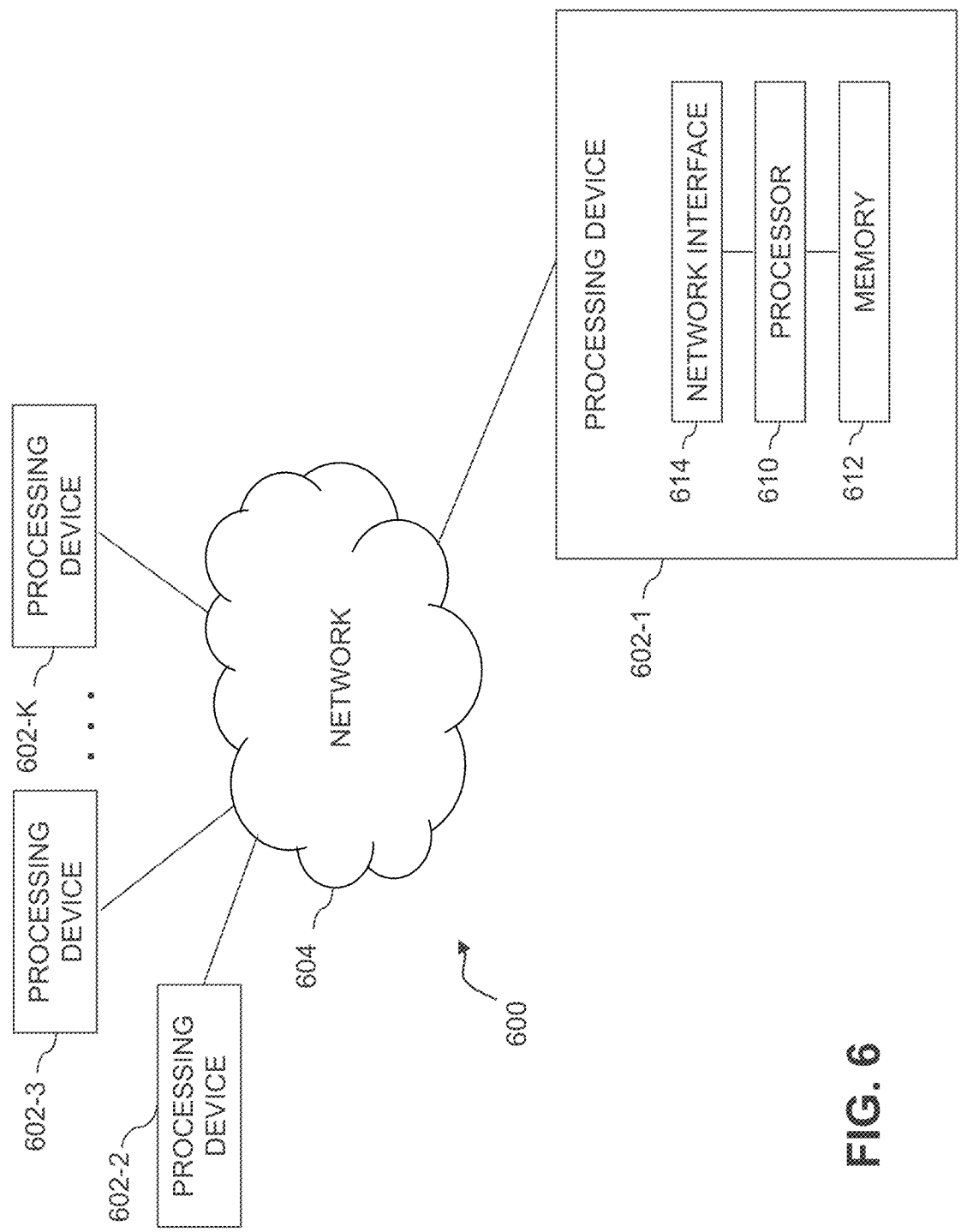
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   performing the following steps, in response to receiving an encrypted file, secured by a first encryption, sent from a user to a backup service as part of a backup of the encrypted file;
   obtaining metadata for the encrypted file, wherein the metadata comprises a file name extension attribute of the encrypted file;
   applying, using at least one processing device of the backup service, an anomaly detection technique to the metadata to compare at least one attribute in the metadata to one or more corresponding historical baseline values for the at least one attribute, wherein the anomaly detection technique comprises a machine learning technique that employs at least one trained machine learning model that is trained using historical time-series data for each of a plurality of file types each having a corresponding file name extension attribute; and
   determining, using the at least one processing device of the backup service, whether the encrypted file, secured by the first encryption, was also encrypted using a ransomware encryption, in addition to the first encryption, based at least in part on the comparison, wherein the ransomware encryption is distinct from the first encryption, wherein the comparison comprises a comparison of (i) a count of files in a repository having the file name extension attribute of the encrypted file to (ii) a corresponding historical baseline value of the count of files in the repository having the file name extension attribute of the encrypted file to identify the ransomware encryption based at least in part on a deviation from an expected file name extension distribution.

2. The method of claim 1, wherein the encrypted file is one or more of a portion of an incremental file backup and a snapshot.

3. The method of claim 1, wherein the comparison of the count of files in the repository having the file name extension attribute of the encrypted file to the one or more corresponding historical baseline values identifies the ransomware encryption based at least in part on a renaming of at least one file name extension attribute.

4. The method of claim 1, wherein the at least one attribute in the metadata comprises a file size attribute of the encrypted file and wherein the comparison to the one or more corresponding historical baseline values reveals one or more of a deviation in size of one or more increments of an incremental backup and a file size of the encrypted file is larger than a corresponding historical baseline value.

5. The method of claim 1, wherein the comparison of the count of files in the repository having the file name extension attribute of the encrypted file to the one or more corresponding historical baseline values identifies that a snapshot file has been sent more than once.

6. The method of claim 1, further comprising the step of evaluating a number of encrypted files sent within a predefined time window.

7. The method of claim 1, wherein the historical time-series data is further used to evaluate a behavior of one or more of the encrypted file and the metadata for the encrypted file.

8. A system, comprising:
a memory; and
at least one processing device, coupled to the memory, operative to implement the following steps:
performing the following steps, in response to receiving an encrypted file, secured by a first encryption, sent from a user to a backup service as part of a backup of the encrypted file;
obtaining metadata for the encrypted file, wherein the metadata comprises a file name extension attribute of the encrypted file;
applying, using at least one processing device of the backup service, an anomaly detection technique to the metadata to compare at least one attribute in the metadata to one or more corresponding historical baseline values for the at least one attribute, wherein the anomaly detection technique comprises a machine learning technique that employs at least one trained machine learning model that is trained using historical time-series data for each of a plurality of file types each having a corresponding file name extension attribute; and
determining, using the at least one processing device of the backup service, whether the encrypted file, secured by the first encryption, was also encrypted using a ransomware encryption, in addition to the first encryption, based at least in part on the comparison, wherein the ransomware encryption is distinct from the first encryption, wherein the comparison comprises a comparison of (i) a count of files in a repository having the file name extension attribute of the encrypted file to (ii) a corresponding historical baseline value of the count of files in the repository having the file name extension attribute of the encrypted file to identify the ransomware encryption based at least in part on a deviation from an expected file name extension distribution.

9. The system of claim 8, wherein the comparison of the count of files in the repository having the file name extension attribute of the encrypted file to the one or more corresponding historical baseline values identifies the ransomware encryption based at least in part on a renaming of at least one file name extension attribute.

10. The system of claim 8, wherein the at least one attribute in the metadata comprises a file size attribute of the encrypted file and wherein the comparison to the one or more corresponding historical baseline values reveals one or more of a deviation in size of one or more increments of an incremental backup and a file size of the encrypted file is larger than a corresponding historical baseline value.

11. The system of claim 8, wherein the comparison of the count of files in the repository having the file name extension attribute of the encrypted file to the one or more corresponding historical baseline values identifies that a snapshot file has been sent more than once.

12. The system of claim 8, further comprising the step of evaluating a number of encrypted files sent within a predefined time window.

13. The system of claim 8, wherein the historical time-series data is further used to evaluate a behavior of one or more of the encrypted file and the metadata for the encrypted file.

14. A computer program product, comprising a tangible machine-readable storage medium having encoded therein executable code of one or more software programs, wherein the one or more software programs when executed by at least one processing device perform the following steps:
performing the following steps, in response to receiving an encrypted file, secured by a first encryption, sent from a user to a backup service as part of a backup of the encrypted file;
obtaining metadata for the encrypted file, wherein the metadata comprises a file name extension attribute of the encrypted file;
applying, using at least one processing device of the backup service, an anomaly detection technique to the metadata to compare at least one attribute in the metadata to one or more corresponding historical baseline values for the at least one attribute, wherein the anomaly detection technique comprises a machine learning technique that employs at least one trained machine learning model that is trained using historical time-series data for each of a plurality of file types each having a corresponding file name extension attribute; and
determining, using the at least one processing device of the backup service, whether the encrypted file, secured by the first encryption, was also encrypted using a ransomware encryption, in addition to the first encryption, based at least in part on the comparison, wherein the ransomware encryption is distinct from the first encryption, wherein the comparison comprises a comparison of (i) a count of files in a repository having the file name extension attribute of the encrypted file to (ii) a corresponding historical baseline value of the count of files in the repository having the file name extension attribute of the encrypted file to identify the ransomware encryption based at least in part on a deviation from an expected file name extension distribution.

15. The computer program product of claim 14, wherein the comparison of the count of files in the repository having the file name extension attribute of the encrypted file to the one or more corresponding historical baseline values identifies the ransomware encryption based at least in part on a renaming of at least one file name extension attribute.

16. The computer program product of claim 14, wherein the at least one attribute in the metadata comprises a file size attribute of the encrypted file and wherein the comparison to the one or more corresponding historical baseline values reveals one or more of a deviation in size of one or more increments of an incremental backup and a file size of the encrypted file is larger than a corresponding historical baseline value.

17. The computer program product of claim 14, wherein the comparison of the count of files in the repository having the file name extension attribute of the encrypted file to the one or more corresponding historical baseline values identifies that a snapshot file has been sent more than once.

18. The computer program product of claim 14, wherein the encrypted file is one or more of a portion of an incremental file backup and a snapshot.

19. The computer program product of claim 14, further comprising the step of evaluating a number of encrypted files sent within a predefined time window.

20. The computer program product of claim 14, wherein the historical time-series data is further used to evaluate a behavior of one or more of the encrypted file and the metadata for the encrypted file.

\* \* \* \* \*